(12) United States Patent
Dohrmann et al.

(10) Patent No.: US 6,913,126 B2
(45) Date of Patent: Jul. 5, 2005

(54) IMPACT DAMPER

(75) Inventors: Wolfgang Dohrmann, Eitorf (DE); Thomas Hansen, Köln (DE)

(73) Assignee: ZF Boge GmbH, Bonn (DE)

( * ) Notice: Subject to any disclaimer, the term of this patent is extended or adjusted under 35 U.S.C. 154(b) by 0 days.

(21) Appl. No.: 10/321,303

(22) Filed: Dec. 17, 2002

(65) Prior Publication Data

US 2003/0111307 A1 Jun. 19, 2003

(30) Foreign Application Priority Data

Dec. 17, 2001 (DE) .......................................... 101 62 061

(51) Int. Cl.[7] .................................................. F16F 9/00
(52) U.S. Cl. ....................... 188/315; 188/371; 267/126; 267/64.26; 267/64.28; 293/134
(58) Field of Search ............................... 267/128, 64.12, 267/64.11, 64.15, 64.17, 64.26, 64.28, 116, 120, 126, 127; 293/134; 188/284, 288, 322.21, 315, 371

(56) References Cited

U.S. PATENT DOCUMENTS

| | | | | |
|---|---|---|---|---|
| 3,722,874 A | * | 3/1973 | Kress ........................ | 267/64.26 |
| 4,078,638 A | * | 3/1978 | Koyama et al. ............ | 188/288 |
| 4,381,857 A | * | 5/1983 | Cook ........................ | 267/64.15 |
| 4,564,176 A | * | 1/1986 | Schnetz .................... | 267/64.11 |
| 5,024,465 A | * | 6/1991 | Baiker ...................... | 280/6.154 |
| 5,242,157 A | * | 9/1993 | Bonenberger et al. ... | 267/64.26 |
| 5,285,877 A | * | 2/1994 | Bonenberger et al. ... | 188/266.2 |
| 6,109,400 A | | 8/2000 | Ayyildiz et al. .......... | 188/266.1 |
| 6,655,509 B2 | * | 12/2003 | Dohrmann et al. ...... | 188/266.2 |

* cited by examiner

Primary Examiner—Robert A. Siconolfi
Assistant Examiner—Bradley T King
(74) Attorney, Agent, or Firm—Cohen, Pontani, Liberman & Pavane

(57) ABSTRACT

An impact damper for deceleration of a vehicle impacting on all obstacle by hydraulic damping forces and gas spring forces includes at least inner and outer pipes telescopically displaceable one inside the other and defining an annular space therebetween with a base closing one end of the inner pipe. A dividing piston is sealingly guided in the inner pipe. The inner pipe, the base, and the dividing piston define a gas space which holds gas under pressure. The inner pipe further defines a first liquid space separated from the gas space by the dividing piston. An intermediate wall is fastened to the inner pipe and includes a throttle opening therethrough connecting a second liquid space to the first liquid space. The annular space between the first and second pipes has one end sealed to the atmosphere and another end sealed by the intermediate wall. The annular space is connected to the second liquid space by a flow connection having a valve.

6 Claims, 3 Drawing Sheets

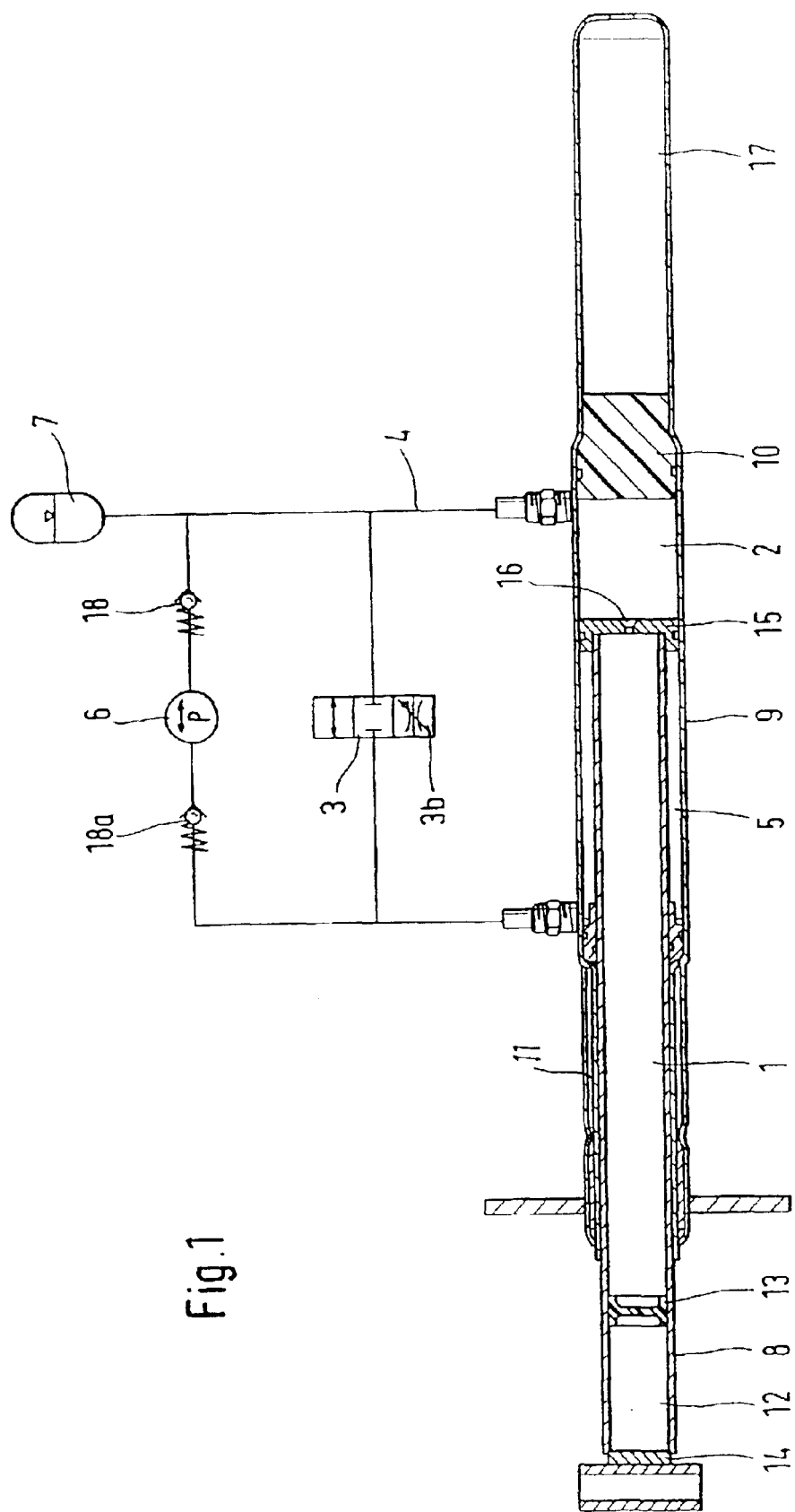

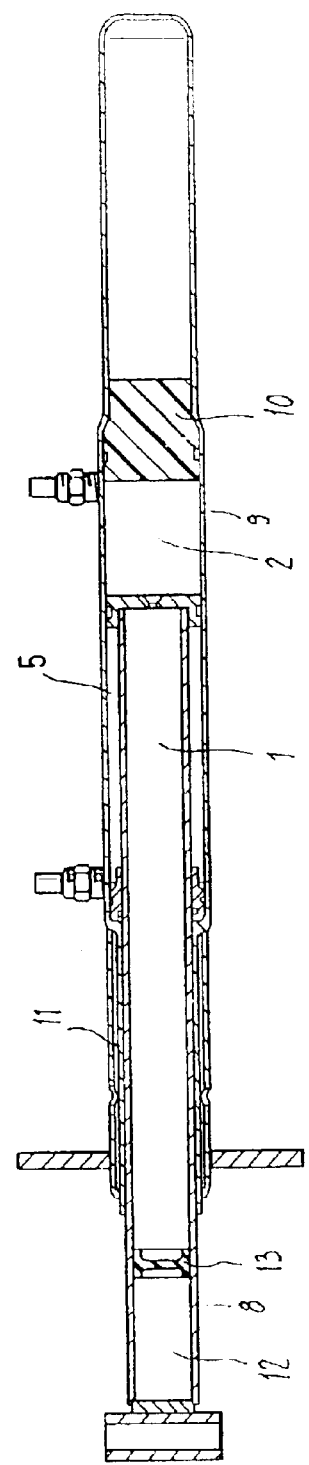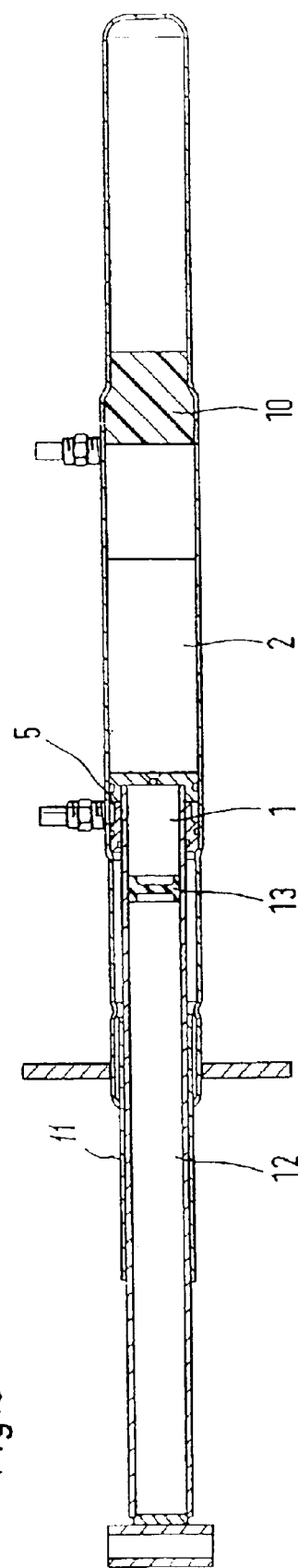

IMPACT DAMPER

BACKGROUND OF THE INVENTION

1. Field of the Invention

The present invention is directed to an impact damper for deceleration of a vehicle upon impact on an obstacle by hydraulic damping forces and gas spring forces, the impact damper having at least two pipes which are telescopically displaceable one inside the other. The inner pipe of the two pipes is closed toward the outside by a base and has a gas space which is under pressure and which cooperates with a first liquid space through a dividing piston which is sealingly guided in the inner pipe. The first liquid space communicates with a second liquid space via a throttle opening located in an intermediate wall fastened in the inner pipe. An annular space is defined between the inner pipe and outer pipe and by a seal toward tile atmosphere and a seal by the intermediate wall.

2. Description of the Related Art

In known impact dampers such as, for example, the impact damper disclosed in U.S. Pat. No. 6,109,400, the deceleration of a vehicle upon impact on an obstacle is effected by hydraulic damping forces and gas spring forces. Two pipes are provided which are telescopically displaceable one inside the other. An inner pipe which is closed toward the outside by a base has a gas space under pressure which cooperates with a first liquid space through a dividing piston which is sealingly guided in the inner pipe. This first liquid space communicates hydraulically with a second liquid space via a throttle opening that is located in an intermediate wall fastened in the inner pipe, while a piston which is fastened to the piston rod is sealingly guided in the inner pipe and cooperates with a third work space. A control may be operatively joined to two chamber for extending the unit and for returning it to the normal position. The manner in which this control functions is not disclosed more fully in this reference.

SUMMARY OF THE INVENTION

It is an object of the present invention to provide an impact damper for a vehicle which has a simple construction with easily producible parts and which also withstands an impact velocity of a vehicle on an obstacle of up to about 20 km/h with reversibility and which at higher speeds achieves the least possible stressing of passengers through specific energy absorption.

The object of the present invention is met by an impact damper having at least two pipes which are telescopically displaceable one inside the other, the inner pipe of the two pipes is closed toward the outside by a base and has a gas space which is under pressure and which cooperates with a first liquid space through a dividing piston which is sealingly guided in the inner pipe. The first liquid space communicates with a second liquid space via a throttle opening located in an intermediate wall fastened in the inner pipe. An annular space is defined between the inner pipe and outer pipe and is sealed toward the atmosphere at one end and sealed by the intermediate wall at the end. The second liquid space is further connected to the annular space by a flow connection having a valve.

The annular space between the inner pipe and the outer pipe is provided with high pressure. When the valve in the flow connection is open, the pressure in the annular space transfers to the second liquid space, thereby moving the inner pipe into an extended position as quickly as possible. The inner pipe moves out rapidly under suitable pressure conditions.

Furthermore, a throttle element is connected to the valve. When a slow extension of the inner pipe is desired, the throttle element connected to the valve may be switched into a position in the flow connection. Therefore it is possible to selectively switch the throttle element into or out of the flow connections Furthermore, a pump may be arranged parallel to the valve in the flow connection. The pump is operable to move the pressure medium from the second liquid space to the annular space in the extended position of the inner pipe and compresses impact damper until the inner pipe reaches its starting position.

To achieve sufficient pressure conditions between the gas space, the first and second liquid spaces, and the annular space, the flow connection may also be connected to a pressure accumulator.

The outer pipe is constructed so that it narrows in diameter proceeding from the second liquid space. A deformation element seals the second liquid space from the narrowed region. When the vehicle impacts in excess of a determined velocity, i.e., when the limit of reversibility is exceeded, the deformation element arranged in the narrowed region deforms the narrow region.

For improved absorption of transverse forces in the event of lateral impact when the impact damper is extended, a guide ring may be arranged between the inner pipe and the outer pipe. The guide pipe preferably extends telescopically.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1 is a longitudinal sectional schematic view of an impact damper according to the present invention;

FIG. 2 is a longitudinal sectional view of only the impact damper of FIG. 1;

FIG. 3 is a longitudinal sectional view of the impact damper of FIG. 1 in the extended position;

DETAILED DESCRIPTION OF THE PRESENTLY PREFERRED EMBODIMENTS

Figure 4:
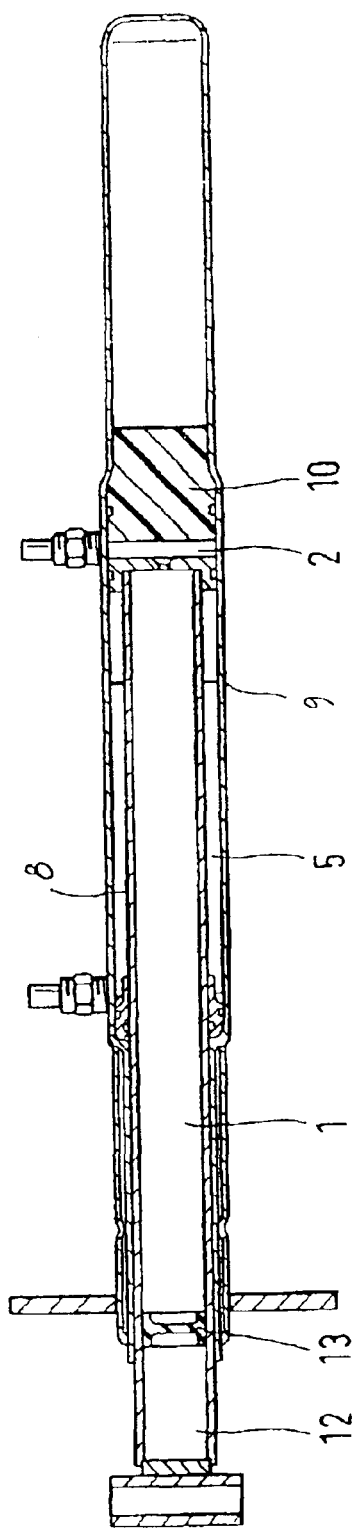
FIG. 4 is a longitudinal sectional view of the impact damper of FIG. 1 in a reversible impact position.

FIG. 1 is a longitudinal sectional view through an impact damper according to the present invention which is changeable in length. An inner pipe 8 of the impact damper is closed toward the outside by a base 14. A dividing piston 13 is sealingly guided along an inner wall of the inner pipe 8 with a sealing ring. A gas space 12 defined by the inner pipe 8, the base 14 and the dividing piston 13 is filled with gas under pressure. A first liquid space 1 likewise located in the inner pipe 8 is separated from the gas space 12 by the dividing piston 13.

An outer pipe 9 is arranged telescopically with an inner pipe 8 and defines an annular space 5 therebetween. A second liquid space 2 is arranged in the outer pipe 9 and is sealed from the annular space 5 by a dividing wall 15 arranged on the inner pipe 8. The first liquid space 1 and the second liquid space 2 are connected through a throttle opening 16 in the dividing wall 15.

A cylindrical area 17 which narrows in diameter is provided in an end area of the outer pipe 9 and is open to the atmosphere. A deformation element 10 arranged in the outer pipe 9 seals the second liquid space 2 from the area 17. When the vehicle impacts an obstacle at an impact velocity above a limiting velocity, the deformation element 10 moves axially along the outer pipe 9 into the area 17 and correspondingly widens the area 17.

The annular space 5 is connected to the second liquid space 2 by a flow connection 4 which includes a valve 3. The annular space 5 is pretensioned at high pressure such that a pressure equilibrium occurs between the annular space 5 and the second liquid space 2 via the flow connection 4 when the valve 3 is opened. The increase in pressure in the second liquid space 2 causes the second liquid space to expand such that the inner pipe 8 is moved outward relative to the outer pipe 9. The first liquid space 1 decreases to a corresponding, degree while the second liquid space 2 increases and the gas space 12 is relaxed by the displacement of the dividing piston 13. The movement of the inner pipe 8 relative to the outer pipe 9 lengthens the impact damper. A pump 6 in series with check valves 18, 18a is also connected in parallel with the valve 3 in the flow connection 4. The damping medium may be pumped back out of the first and second liquid spaces 1 and 2 past the valve 3 into the annular space 5 by the pump 6 via check valves 18 and 18a, so that the annular space 5 again achieves a corresponding high pretensioning and the impact damper is moved back to the starting position.

The valve 3 further comprises a throttle valve 3b which is selectively switchable into the flow connection 4. The throttle valve 3b is selectively used when the inner pipe 8 is to be moved out slowly. A pressure accumulator 7 which is likewise correspondingly pretensioned by the pump 6 is, in addition, arranged in the flow connection 4 for achieving sufficient pressure ratios.

FIG. 2 shows an impact damper which corresponds in principle to the example of FIG. 1 and is shown in the same position as FIG. 1.

FIG. 3 shows the impact damper in an extended position. The pressure in the annular space 5 has been reduced to a minimum such that the first liquid space 1 is decreased and the second liquid space 2 is correspondingly increased. The gas space 12 achieves a corresponding greater pressure pretensioning.

FIG. 4 shows the position of the impact damper when impact occurs in the reversibility range. In this condition, the deformation element 10 remains in the initial position, while the second liquid space 2 has decreased correspondingly, so that the first liquid space 1 and the annular splice 5 undergo a corresponding increase. The dividing piston 13 occupies a corresponding further extended position. After the impact of the vehicle the impact damper again occupies its original position according to FIG. 2 due to the corresponding, internal pressures in the gas space 12, the first liquid space 1, the second liquid space 2 and the annular space 5.

Figure 5:
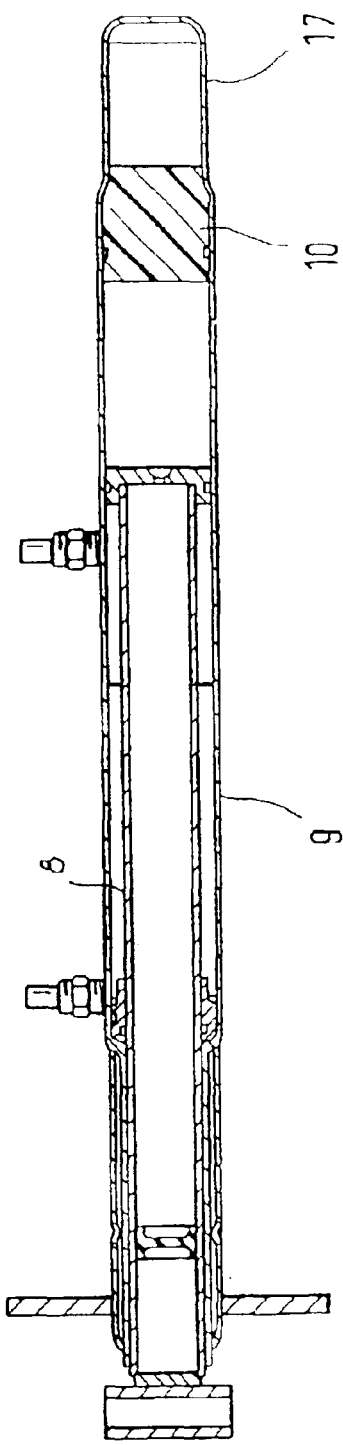
FIG. 5 is a longitudinal sectional view of the impact damper of FIG. 1 after a non-reversible impact.

FIG. 5 shows the position of the impact damper after an impact with an obstacle at an impact velocity which exceeds a limiting velocity. The deformation element 10 has been pressed in by the force of the impact into area 17 which deforms i.e., expands, the outer pipe 9 in the area 17. After the impact, a plastic deformation of area 17 remains relative to the original state of the impact damper shown in FIGS. 2 to 4.

To minimize the possibility of explosions in the event of fire, the deformation element 10 may be made of a material which melts in fire, such as, for example plastic. The individual spaces in the impact damper and the annular space between the inner and outer pipes are dimensioned corresponding to the required energy absorption characteristics.

For improved absorption of transverse forces when the impact damper is expanded, a guide ring 11 may be arranged between the inner pipe 8 and the outer pipe 9. The guide pipe 11 extends telescopically.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An impact damper for deceleration of a vehicle upon impact on all obstacle by hydraulic damping forces and gas spring forces, comprising:

an inner pipe and outer pipe telescopically displaceable one inside the other and defining an annular space therebetween having two axial ends;

a base closing one end of said inner pipe;

a dividing piston sealingly guided in said inner pipe, a gas space holding gas under pressure being defined by said inner pipe, said base, and said dividing piston, said inner pipe further defining a first liquid space separated from said gas space by said dividing piston;

an intermediate wall fastened to said inner pipe and having a throttle opening therethrough connecting a second liquid space to said first liquid space, said intermediate wall sealing one of said axial ends of said annular space defined between said inner pipe and said outer pipe, wherein the other axial end of said annular space is sealed to the atmosphere; and a flow connection having a valve connected between said annular space and said second liquid space by said flow connection, wherein said flow connection allows a pressure equilibrium to occur between said annular space and said second liquid space by conducting a flow through said flow connection when said valve is opened.

2. The impact damper of claim 1, wherein said valve further comprises a throttle element selectively connectable in said flow connection.

3. The impact damper of claim 1, further comprising a pump arranged parallel to said valve in said flow connection.

4. The impact damper of claim 1, further comprising a pressure accumulator connected to said flow connection.

5. An impact damper for deceleration of a vehicle upon impact on an obstacle by hydraulic damping forces and gas spring forces, comprising:

an inner pipe and an outer pipe telescopically displaceable one inside the other and defining an annular space therebetween having two axial ends;

a base closing one end of said inner pipe;

a dividing piston sealingly guided in said inner pipe, a gas space holding gas under pressure being defined by said inner pipe, said base, and said dividing piston, said inner pipe further defining a first liquid space separated from said gas space by said dividing piston;

an intermediate wall fastened to said inner pipe and having a throttle opening therethrough connecting a second liquid space to said first liquid space, said intermediate wall sealing one of said axial ends of said annular space defined between said inner pipe and said outer pipe, wherein the other axial end of said annular space is sealed to the atmosphere; and a flow connection having a valve connected between said annular space and said second liquid space, wherein said outer pipe includes an area that narrows in diameter proceeding from said second liquid space and a deformation element arranged in said outer pipe which simultaneously seals said second liquid space from the narrowed area.

6. The impact damper according to claim 1, further comprising a guide ring arranged between said inner pipe and said outer pipe.

* * * * *